F. A. GREARSON.
STONE CUTTING LATHE.
APPLICATION FILED JUNE 28, 1910.

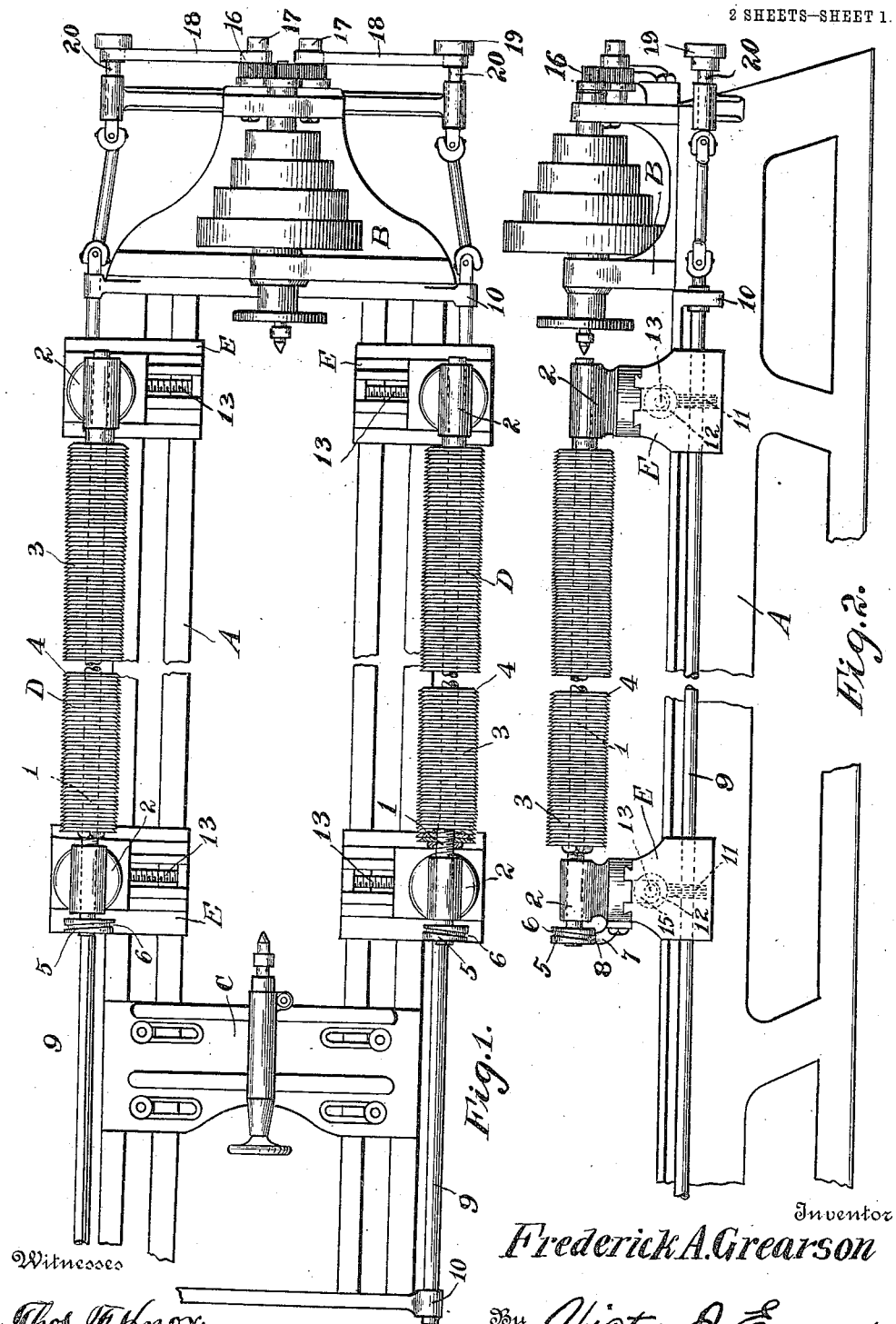

1,042,217.

Patented Oct. 22, 1912.

2 SHEETS—SHEET 2.

Witnesses
Thos. F. Knox,
C. Bradway

Inventor
Frederick A. Grearson
By Victor J. Evans
Attorney

UNITED STATES PATENT OFFICE.

FREDERICK A. GREARSON, OF BARRE, VERMONT, ASSIGNOR OF ONE-THIRD TO WILLIAS A. LANE, OF BARRE, VERMONT.

STONE-CUTTING LATHE.

1,042,217.

Specification of Letters Patent.

Patented Oct. 22, 1912.

Application filed June 28, 1910. Serial No. 569,345.

*To all whom it may concern:*

Be it known that I, FREDERICK A. GREARSON, a citizen of the United States, residing at Barre, in the county of Washington and State of Vermont, have invented new and useful Improvements in Stone-Cutting Lathes, of which the following is a specification.

This invention relates to a lathe designed more especially for cutting stone columns.

The invention has for one of its objects to improve and simplify the construction and operation of lathes of this character so as to be reliable and efficient in use, and capable of trimming and finishing a column with great rapidity and with a minimum of wear on the cutters.

Another object of the invention is to provide a lathe having cutters extending the full length of the work and automatically fed inwardly for cutting the work down to size, each consisting of a plurality of disks rotatably mounted on an arbor so as to revolve by contact with the work, and thereby produce a continuous cutting of the matter.

Another object of the invention is the provision of means for automatically introducing a slight relative longitudinal movement between the cutters and work so as to insure the cutting of a smooth surface.

With these objects in view and others, as will appear as the description proceeds, the invention comprises the various novel features of construction and arrangement of parts which will be more fully described hereinafter and set forth with particularity in the claim appended hereto.

Figure 3:
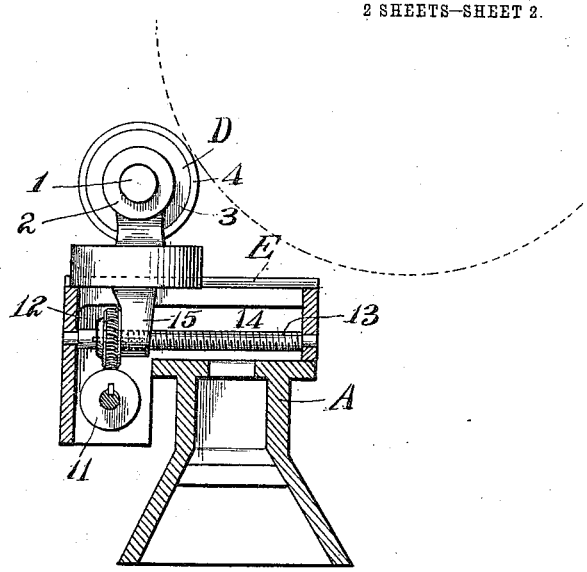
Figure 4:
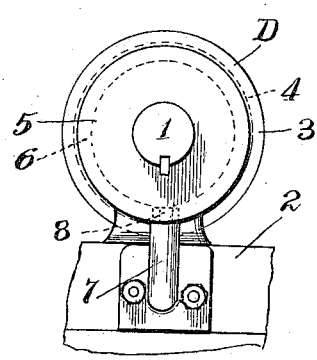
Figure 5:
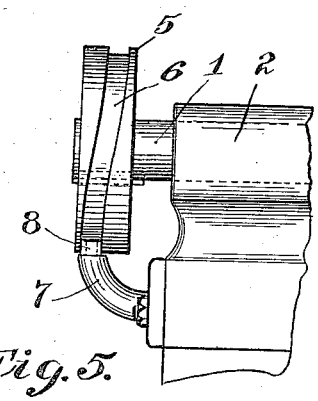

In the accompanying drawings, which illustrate one embodiment of the invention, Figure 1 is a plan view of the lathe with intermediate portions broken away. Fig. 2 is a side view thereof. Fig. 3 is a detail section of one of the tool carriages and means for feeding the same. Fig. 4 is an end view of the cam wheel for moving the cutter longitudinally. Fig. 5 is an elevation of the device shown in Fig. 4.

Similar reference characters are employed to designate corresponding parts throughout the views.

Referring to the drawings, A designates the bed of the lathe which has at its ends the head stock B and the tail stock C that rotatably support the stone column or work. In the present instance, two oppositely-disposed cutters D are arranged to operate on the work, but it is to be understood that any desired number of cutters may be employed. Each cutter consists of an arbor 1 that extends horizontally and has its ends rotatably mounted in bearings 2 on carriages E. In the present instance, two carriages are shown at each side of the work, and mounted on the bed, the carriages being spaced apart a distance approximately equal to the length of the cutter supported thereby. On the arbor are arranged disks 3 that have peripheral edges 4 that bear against the stone block or column to be trimmed, and by means of this engagement, the cutter disks are rotated. The cutter disks may be of different shapes, according to the work to be done, and they may be clamped in any suitable manner to the arbors. It may be preferable to produce relative longitudinal movement between the work and cutters so that the forming of ridges in the work will be prevented, and for this purpose each cutter may be provided at one end with a wheel 5 fastened to the end of the arbor to rotate therewith, the said wheel having a cam groove 6 into which extends a finger 7 fastened to the adjacent bearing 2, and on this finger is arranged a roller 8 which reduces the friction between the finger and groove of the wheel. As the wheel rotates, the arbor will be moved back and forth longitudinally with respect to the work.

The cutters are automatically fed inwardly so as to cut down the column to the proper size, and for this purpose rotary shafts 9 extend horizontally along the front and rear of the bed and are journaled in bearings 10 on the latter, and at each carriage E the shaft 9 is provided with a worm 11 which meshes with a gear wheel 12 on a screw 13 that is journaled on the base 14 for the carriage E, the said screw being engaged in the nut 15 fixed to the sliding part of the carriage. The screws 13 operate simultaneously so that the cutter is fed transversely to the lathe as the work rotates and as the result the work is gradually reduced in size. The shafts 9 can be rotated in any suitable manner from the spindle of the lathe, as for instance by gearing 16 at the head stock end of the bed, which gearing rotates stepped pulleys 17 that are connected by belts 18 with stepped pulleys 19 on stub shafts 20, which stub shafts are flexibly connected with the worm shafts 9. In a lathe of this construction, the work can be cut to the desired size with great rapidity and the feed takes place automatically so that no attention is required on the part of the attendant during the cutting operation, except the initial adjusting of the work and cutters and stopping of the machine at the proper time.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, is:—

A stone cutting machine comprising supports forming guides, a head piece having a shaft and rotatable on one of said supports, a tail piece adjustable on said supports, members adjustable on said guide ways and provided with transverse guide ways, bearing blocks movable on said transverse guide ways, shafts journaled on said bearing blocks and provided with a plurality of contacting cutter disks having beveled edges, a wheel carried by each of said shafts and provided with a cam groove, a finger disposed in each of said cam grooves for longitudinally reciprocating said shaft, screws for moving said bearing blocks, the shafts having worms coöperating with said screws, gearing operating with the shaft of the head piece, flexible means connected with said shafts adapted to permit of their adjustment and means connected with said gearing for driving said flexible means.

In testimony whereof I affix my signature in presence of two witnesses.

FREDERICK A. GREARSON.

Witnesses:
　EARLE R. DAVIS,
　JAMES W. GREARSON.

---

Copies of this patent may be obtained for five cents each, by addressing the "Commissioner of Patents, Washington, D. C."